US011429535B1

(12) United States Patent
Mestan et al.

(10) Patent No.: US 11,429,535 B1
(45) Date of Patent: Aug. 30, 2022

(54) CACHE REPLACEMENT BASED ON TRAVERSAL TRACKING

(71) Applicant: Apple Inc., Cupertino, CA (US)

(72) Inventors: Brian R. Mestan, Austin, TX (US); Peter G. Soderquist, Natick, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/372,356

(22) Filed: Jul. 9, 2021

(51) Int. Cl.
*G06F 12/1009* (2016.01)
*G06F 12/1027* (2016.01)
*G06F 12/02* (2006.01)
*G06F 12/0817* (2016.01)
*G06F 12/128* (2016.01)
*G06F 12/0811* (2016.01)

(52) U.S. Cl.
CPC ...... *G06F 12/1009* (2013.01); *G06F 12/0238* (2013.01); *G06F 12/0811* (2013.01); *G06F 12/0824* (2013.01); *G06F 12/1027* (2013.01); *G06F 12/128* (2013.01)

(58) Field of Classification Search
CPC ............. G06F 12/0238; G06F 12/0811; G06F 12/0824; G06F 12/1009; G06F 12/1027; G06F 12/128
See application file for complete search history.

(56) References Cited

U.S. PATENT DOCUMENTS

| 5,960,452 | A | * | 9/1999 | Chi | G11B 27/329 |
| | | | | | 711/117 |
| 8,095,771 | B2 | | 1/2012 | Sheu et al. | |
| 8,397,049 | B2 | | 3/2013 | Wang et al. | |
| 10,191,853 | B2 | | 1/2019 | Abhishek | |
| 2006/0155915 | A1 | * | 7/2006 | Pereira | H04L 45/60 |
| | | | | | 711/100 |
| 2021/0073131 | A1 | | 3/2021 | Krueger | |

OTHER PUBLICATIONS

Barr et al., "Translation Caching: Skip, Don't Walk (the Page Table)," ISCA'10, Jun. 19-23, 2010; 12 pages.
Bhargava et al., "Accelerating Two-Dimensional Page Walks for Virtualized Systems," ASPLOS'08 Mar. 1-5, 2008, pp. 26-35.

* cited by examiner

*Primary Examiner* — Aracelis Ruiz
(74) *Attorney, Agent, or Firm* — Kowert, Hood, Munyon, Rankin & Goetzel, P.C.; Michael B. Davis; Dean M. Munyon (57) ABSTRACT

Techniques are disclosed relating to controlling cache replacement. In some embodiments, search control circuitry is configured to perform multiple searches of a data structure (e.g., page table walks) where searches traverse multiple links between elements of the data structure. In some embodiments, a traversal cache caches traversal information that is usable by searches to skip one or more links traversed by one or more prior searches. In some embodiments, tracking control circuitry stores tracking information in a first entry, where the tracking information indicates a location in the traversal cache at which prior traversal information for a first search is stored. In some embodiments, replacement control circuitry selects, based on the tracking information in the first entry of the tracking control circuitry, an entry in the traversal cache for new traversal information generated by the first search (which may include selecting the first entry to override a default replacement policy).

20 Claims, 8 Drawing Sheets

Example tracking control
circuit entry
400

| Search identifier | Location of cache entry for this search |
|---|---|

FIG. 4

Tracking
queue
500

History table
510

| Valid? | Location of HTLB entry |
|---|---|

⋮

| Valid? | Location of HTLB entry |
|---|---|

CACHE REPLACEMENT BASED ON TRAVERSAL TRACKING

BACKGROUND

Technical Field

This disclosure relates generally to microprocessor caching and more particularly to controlling replacement of cached data in certain scenarios.

Description of the Related Art

Various types of circuitry may search a data structure and cache information during the traversal, e.g., for use in subsequent traversals. As one example, a processor may traverse a hierarchical page table structure to translate addresses in one space (e.g., a virtual space) to another space (e.g., a physical space). For example, a multi-level page table implementation may include catalog, directory, and page table levels. Some table walks may involve multiple dimensions or stages. For example, in implementations with virtualization, a page table walk may include translations for one or more hypervisor levels.

A processor may cache information to skip links in one or more dimensions during a traversal. For example, a translation lookaside buffer (TLB) may store a translation from a virtual address to a physical address. One or more translation caches may store data for intermediate steps in a table walk to avoid those steps for future walks.

DETAILED DESCRIPTION

As discussed above, a processor may cache information during traversal of a data structure to improve performance of subsequent traversals. In disclosed embodiments, certain cache entries may be identified as no longer useful and the processor may replace cache entries based on this identification (e.g., replacing a previous entry for the same search rather than replacing an entry according to a default replacement policy such as a least-recently-used (LRU) policy).

Figure 1:
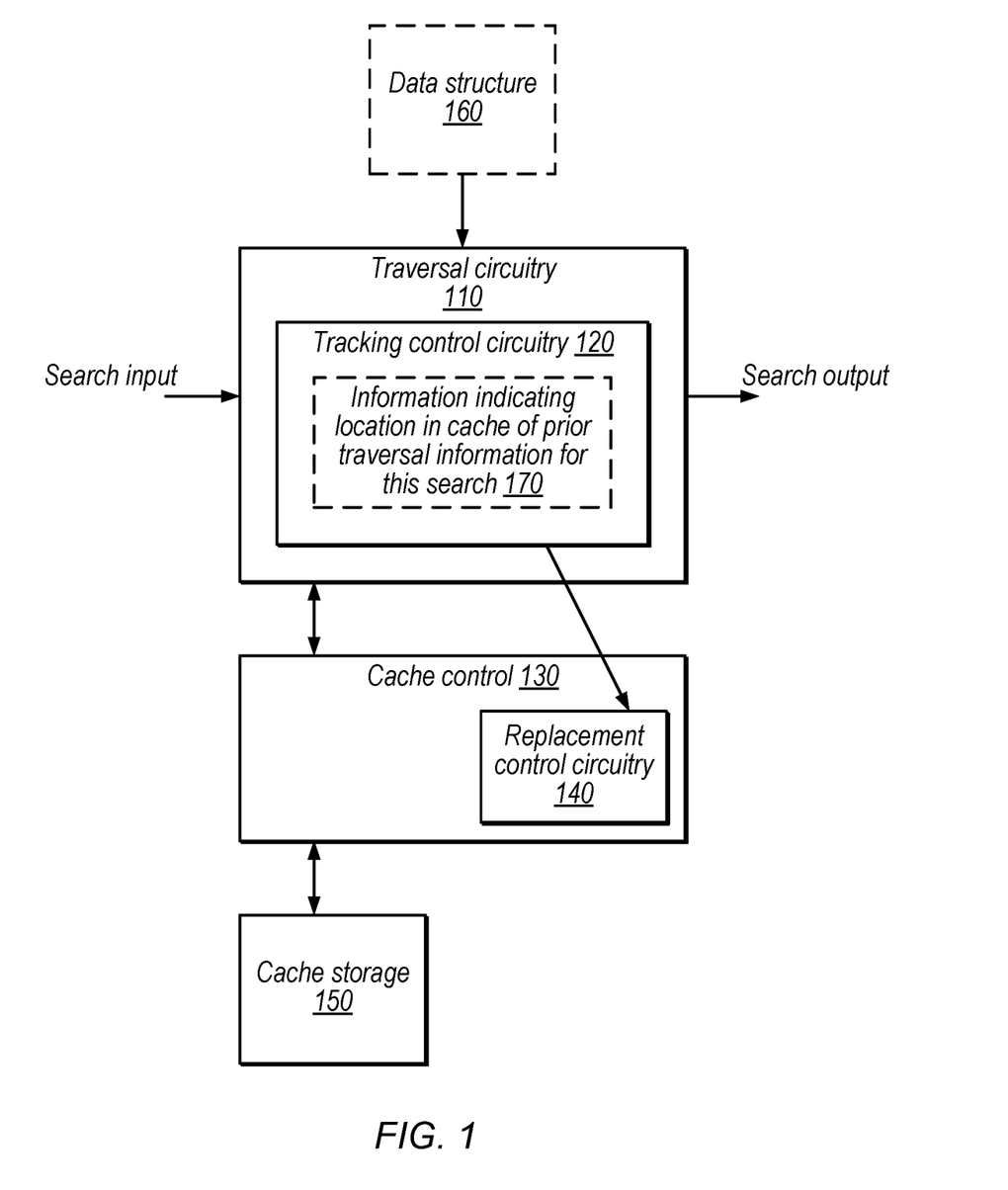
FIG. 1 is a diagram illustrating an overview of traversal circuitry configured to search a data structure, according to some embodiments.
Figure 2:
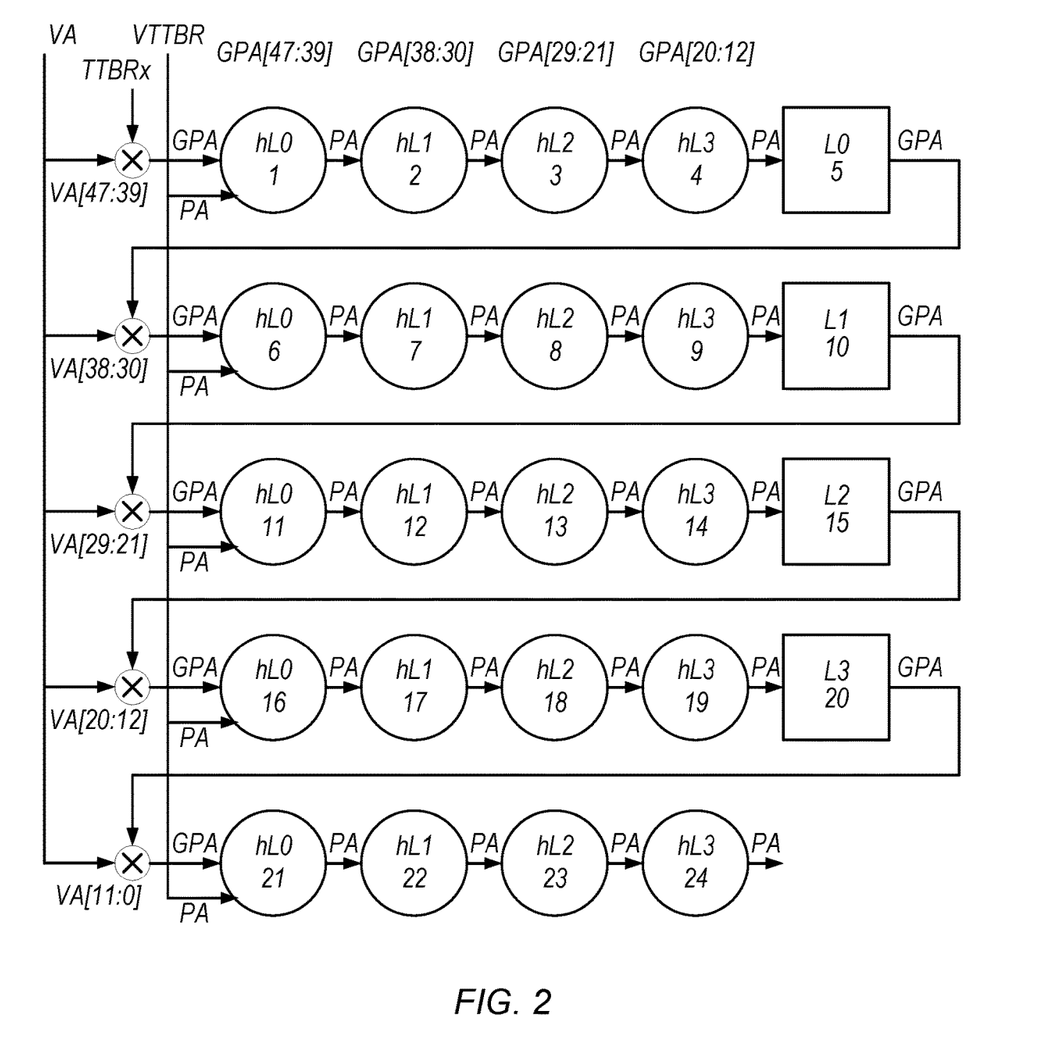
FIG. 2 is a diagram illustrating an example multi-stage page table data structure, according to some embodiments.
Figure 3:
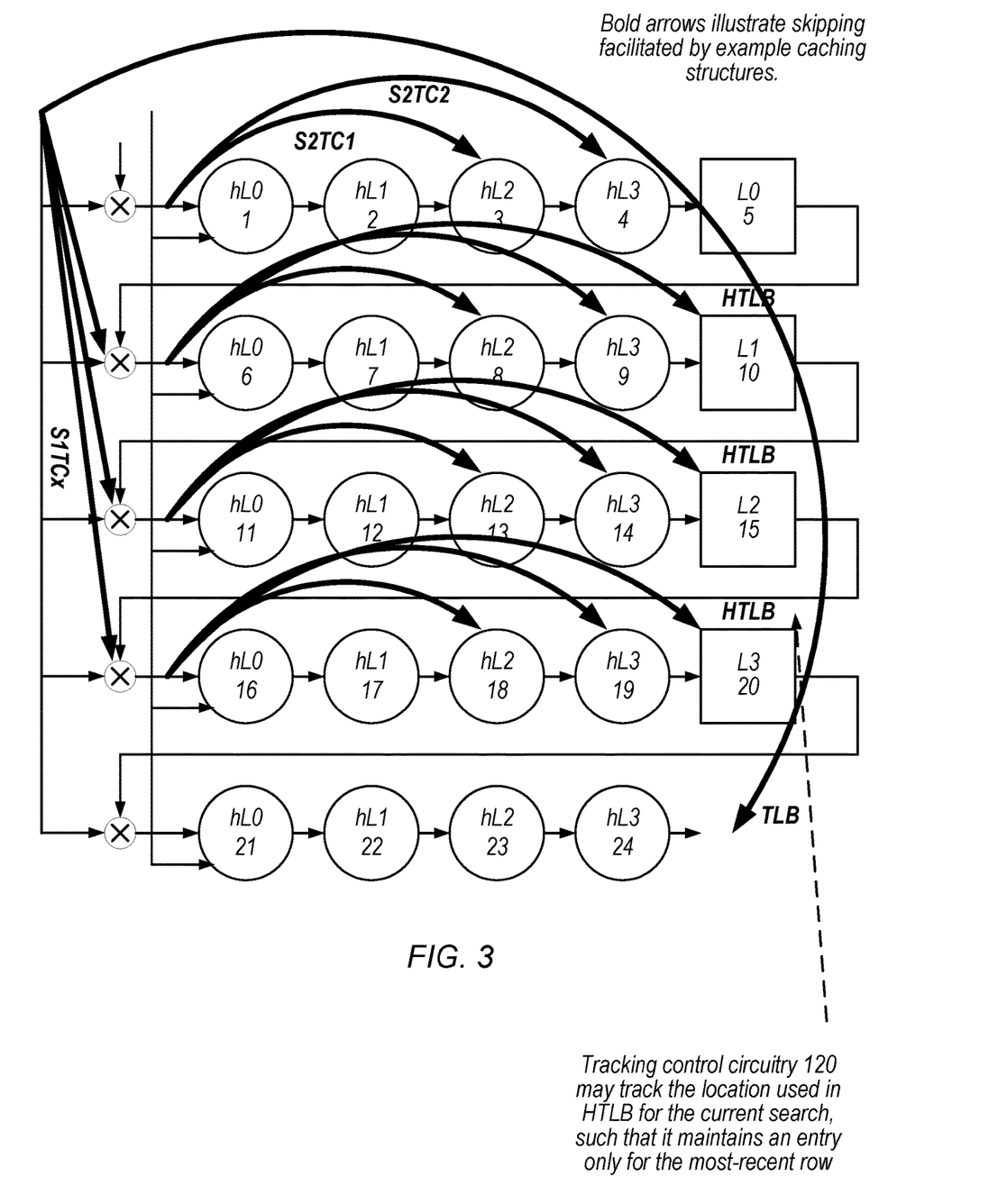
FIG. 3 is a diagram illustrating use of example caching structures to skip portions of a page table walk, according to some embodiments.
Figure 4:
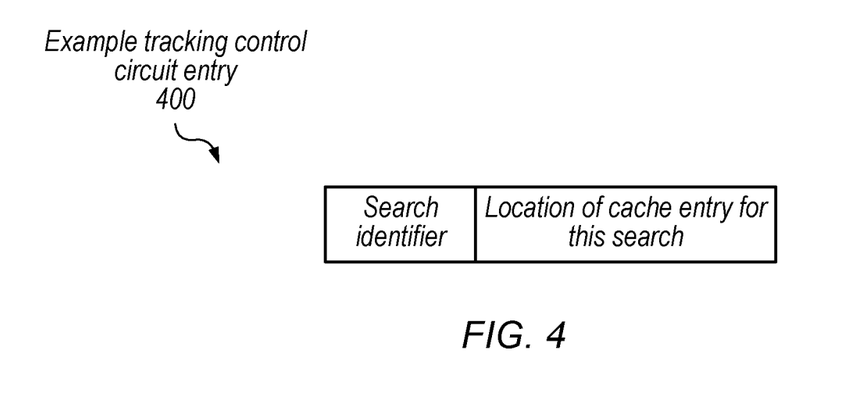
FIGS. 4 and 5 are block diagrams illustrating example structures for tracking a cache locations used for a given search, according to some embodiments.
Figure 5:
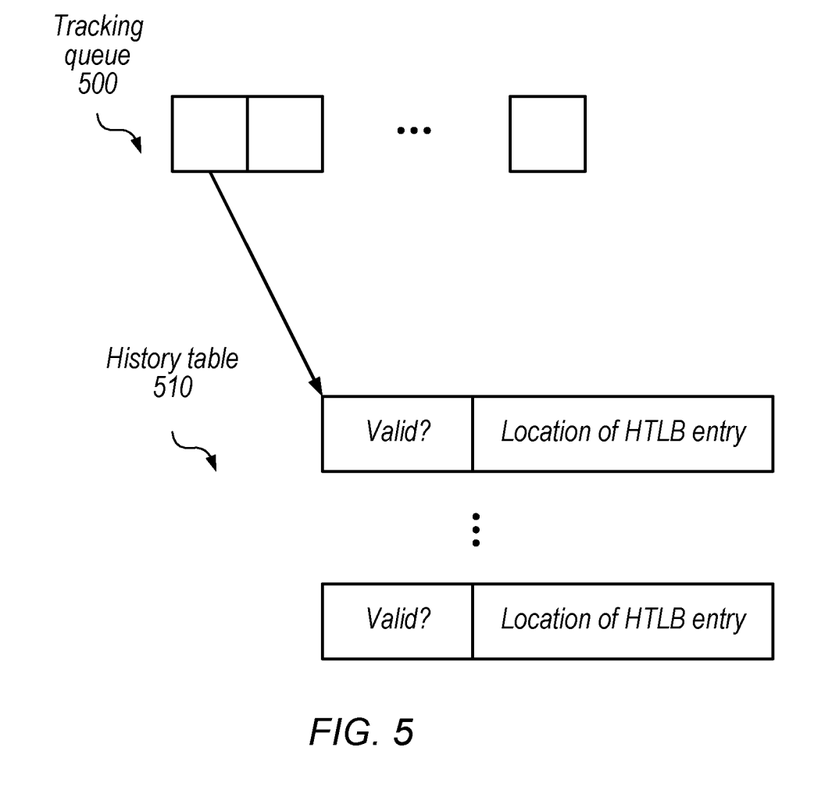

In disclosed embodiments, tracking control circuitry may maintain information indicating a location in a cache at which prior traversal information is stored for a given search. FIG. 1 provides an overview of tracking control circuitry. FIG. 2 provides an example two-stage table walk. FIG. 3 provides example caching and information maintained by the tracking control circuitry for a two-stage table walk. FIGS. 4 and 5 provide example structures for tracking control information. The remaining figures provide an example method, system, applications, and computer-readable medium.

Overview of Cache Tracking Control Circuitry

FIG. 1 is a block diagram illustrating cache tracking control circuitry, according to some embodiments. In the illustrated embodiment, a processor includes traversal circuitry 110, cache control circuitry 130, and cache storage 150.

Traversal circuitry 110, in the illustrated embodiment, is configured to traverse a data structure 160 based on a search input and generate a search output. As one example, traversal circuitry 110 may receive a virtual address as a search input and perform a page table walk to generate a physical address as a search output. In the illustrated embodiment, traversal circuitry 110 includes tracking control circuitry 120.

Cache storage 150, in the illustrated embodiment, implements one or more caches configured to store information generated during a search of data structure 160. This cached information may be used to expedite subsequent searches, for example.

Cache control circuitry 130, in the illustrated embodiment, is configured to control cache storage 150, e.g., by generating hits and misses, allocating new entries, selecting entries to replace to make room for new entries (e.g., based on logic implemented by replacement control circuitry 140), flushing cached data in response to certain events, etc. Therefore, in some embodiments control circuitry 130 includes content-addressable memory used to detect tag hits and circuitry configured to maintain cache line status while cache storage 150 is a random access memory (RAM) configured to store actual cached data. In the illustrated embodiment, cache control circuitry 130 includes replacement control circuitry configured to determine which cache entries to replace, e.g., when the cache is full and a new entry needs to be allocated.

Note that traversal circuitry 110 may include or communicate with multiple different caches, one or more of which may implement the disclosed replacement control techniques. Further, the distribution of circuitry among elements 110, 130, and 150 is discussed for purposes of explanation but is not intended to limit the scope of the present disclosure. As well understood by those of skill in the art, cache storage, cache control, etc. may be distributed among circuit blocks in various manners.

Tracking control circuitry 120, in the illustrated embodiment, is configured to store information 170, which indicates the location in the cache of prior traversal information that was cached for the current search. In some embodiments, tracking control circuitry 120 is configured to override a default replacement policy implemented by replacement control circuitry 140 in certain situations.

As one example, tracking control circuitry 120 may track the cache entry used to store a certain type of traversal data, such as a final result for a given level in a multi-level search. In some embodiments, this information may become redundant when the final result is generated for the subsequent level in the search, examples of which are discussed in detail below. In these embodiments, the tracking control circuitry 120 may control replacement control circuitry 140 to overwrite the previous entry with new data to be cached rather than using a default replacement policy such as an LRU policy.

Overview of Example Multi-Stage Table Walk and Translation Caches

FIG. 2 is a diagram illustrating an example multi-stage table walk, according to some embodiments. In the illustrated example, the rows represent page table hierarchy levels and the columns represent hypervisor levels. In the illustrated example, the following acronyms are utilized: VA=virtual address, PA=physical address, GPA=guest physical address, TTBR=translation table base register, and VTTBR=virtualization translation table base register. As shown, portions of the virtual address are used to index into different levels of the page table hierarchy and portions of the guest physical address at a given level are used to traverse hypervisor levels.

In the illustrated example, the nodes are numbered based on the order in which they are reached during a full traversal of the structure (beginning at 1 for a node hL0 and ending at 24 for a node hL3) Note that a given search may not utilize all of those links in the example structure of FIG. 2. As one example, in a situation with large pages, the L2 box (step 15) or the L3 box (step 20) may output the final physical address and the final level(s) may not be utilized.

Note that disclosed techniques may also be utilized in single-stage hierarchical translations, e.g., with page catalog, directory, and table levels but without hypervisor considerations. The disclosed two-stage example is included for purposes of explanation but is not intended to limit the scope of the present disclosure.

As discussed above, caching information during a traversal of the structure of FIG. 2 may expedite subsequent traversals.

FIG. 3 is a diagram illustrating example link skipping, based on traversal caches, for the data structure of FIG. 2, according to some embodiments. In the illustrated example, a processor implements a TLB, multiple stage 1 translation caches (S1TC's), multiple stage 2 translation caches (S2TC's), and a hypervisor TLB (HTLB). Traversal circuitry 110 may include or communicate with various caching circuitry discussed with reference to FIG. 3.

The S1TC's, in the illustrated example, cache information that allows skipping one or more rows of the structure based on a portion of a virtual address. These caches may check virtual addresses (or respective portions thereof) and output the GPA of the corresponding hL0 node for hits. The S2TC's, in the illustrated embodiment, cache information that allows skipping one or more columns in a row of the data structure based on a portion of a guest physical address. These caches may check GPAs and output the PA of a corresponding node in a given row for hits. Note that an S2TC0 (not shown) may allow skipping the first column, in some embodiments.

For example, consider a situation where there is a hit S1TC1 and a hit in S2TC2. In this situation, the search may proceed directly from the initial VA to hL3 (step 14 of a full traversal) based on these hits, skipping previous links in the data structure. As another example, hits in S1TC0 and S2TC1 would allow skipping to hL2 (step 8 of a full traversal).

The TLB, in the illustrated embodiment, includes entries that map virtual addresses directly to physical addresses. Therefore, a TLB hit for a virtual address may output a final physical address and may allow skipping traversal of the data structure entirely.

The HTLB, in the illustrated embodiment, includes entries that map GPAs to a physical address of the last node at a given level in the multi-dimensional data structure. In the illustrated example, an HTLB hit may allow skipping traversal of most of a given row of the data structure. For example, a hit in S1TC1 and the HTLB may allow skipping to the L2 box (step 15 of a full traversal).

When an additional row in the data structure is traversed, one or more previous entries in the HTLB may become potentially redundant based on information in other caches. In the illustration of FIG. 3, for example, an S1TC entry may allow skipping past the location indicated by the HTLB once traversal has proceeded to the next row (at least until the S1TC entry is evicted).

Example Application of Cache Tracking Control Circuitry to Multi-Stage Table Walk Therefore, as explained by the text in the lower portion of FIG. 3, in some embodiments tracking control circuitry 120 is configured to track the entry in the HTLB at which previous data for the current search was cached and overwrite that entry when new HTLB data is generated. The overwrite may update both the tag (e.g., a GPA) and the data (e.g., a PA) of the entry. This may override a default replacement policy for the HTLB, e.g., by overwriting/replacing the entry at which previous data was stored rather than replacing a least-recently-used entry. This may reduce interference with other HTLB data, e.g., by avoiding multiple HTLB entries for a given search, which may be effectively redundant due to data in other caches.

In some embodiments, tracking control circuitry 120 is configured to overwrite the previous HTLB entry for a given search in some situations but not others. For example, tracking control circuitry may determine to overwrite the previous entry when the cache is within a threshold level of being full but otherwise may allocate a new HTLB entry for new translation data from the same search. When allocating a new entry for a given search, tracking control circuitry 120 may also alter retention data for other HTLB entries for the same search. For example, when deciding not to overwrite an existing HTLB entry for the search, tracking control circuitry 120 may change a replacement value for the existing entry such that it is less likely to be retained, given that the older entry may be more likely to be redundant once the new entry is allocated (e.g., by adjusting a value to make it appears as if the existing entry was used less recently).

Note that overwriting an existing traversal cache entry may or may not result in loss of the data in the entry. In hierarchical caching embodiments, the overwritten data may be written back to another cache or storage level, for example, and may be retrieved into the traversal cache in the future if needed. Therefore, overwriting a given entry may or may not result in complete loss of the entry's previous data.

The disclosed tracking techniques may provide various technical advantages. For example, disclosed techniques may provide increased performance for an HTLB of a given size or allow a reduction in size of the HTLB without reducing performance. More generally, disclosed techniques may reduce caching circuit area for data structure traversals or may improve search performance at a given circuit area.

FIG. 4 is a block diagram illustrating an example entry 400 in tracking control circuitry, according to some embodiments. In the illustrated example, an entry includes a search identifier field that identifies the current search and a field that specifies the location of the cache entry (e.g., in HTLB) used for that search. Tracking control circuitry may implement a number of entries to track different searches, which may be performed at least partially in parallel. Further, tracking control circuitry may implement multiple entries for a given search, e.g., to track entries used by the search in multiple types of caches.

FIG. 5 is a block diagram illustrating an alternative example circuit structure for tracking control circuitry, according to some embodiments. In the illustrated embodiment, tracking control circuitry implements a tracking queue 500 and a history table 510. The tracking queue 500 may allocate an entry for each active search (e.g., per starting virtual address for table walk implementations). The history table 510 includes an entry for each tracking queue entry that includes a valid field and a location of the HTLB entry used for that search. The address may have a format that is based on the associativity of the cache (e.g., an index, an index and a way, etc.). For example, the tracking control circuitry may allocate an entry in the history table 510 on the first write to the HTLB for a given search (which may be allocated according to a default replacement policy such as LRU) and overrate that entry for subsequent writes to the HTLB.

Thus, in disclosed embodiments, in addition to caching data for a search, a processor may use a separate structure in tracking circuitry to track the location(s) at which data is cached (e.g., an entry 400 or an entry in history table 510). The separate structure may identify the tracked cache entry using various appropriate encodings. Note that the example circuit structures of FIGS. 4 and 5 are not intended to limit the scope of the present disclosure; various tracking structures may be implemented in other embodiments.

Note that while various disclosed techniques are implemented in hardware, similar techniques may be implemented using software modules. For example, operating system kernels may set up caches in random access memory and user application may use memory caches for various purposes. In some embodiments, disclosed techniques are applied to replacement policies for those caches, e.g., to overwrite a previously-used entry for a traversal rather than using a default replacement policy.

Example Method

Figure 6:
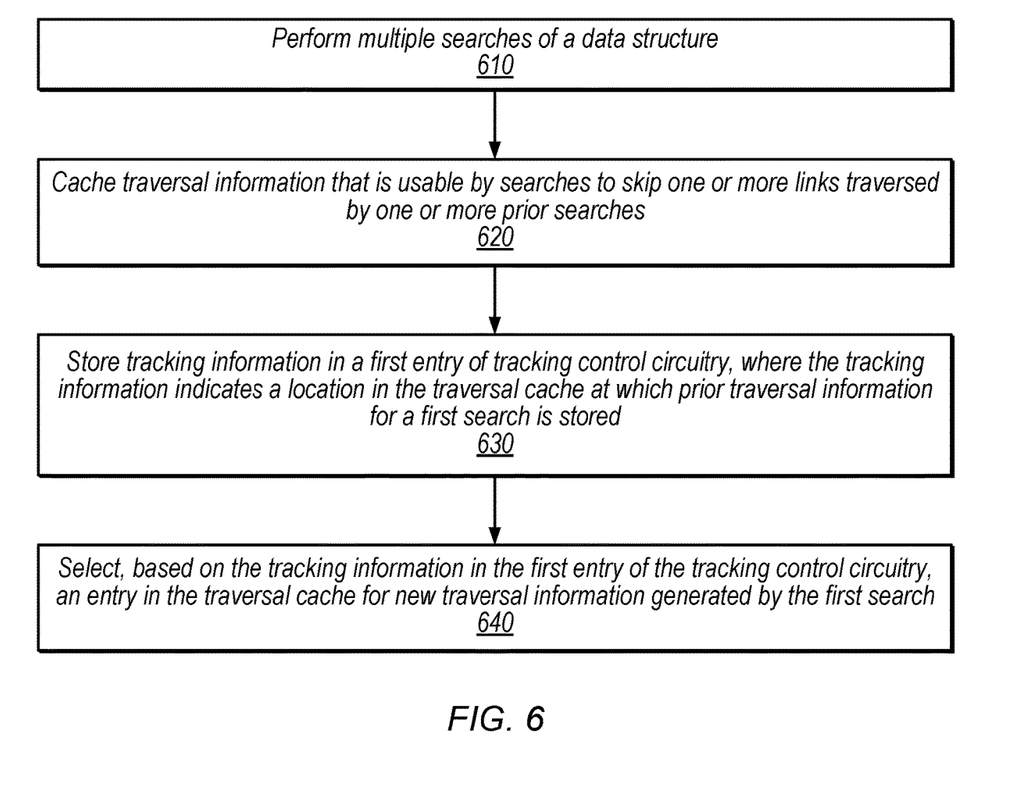
FIG. 6 is a flow diagram illustrating an example method, according to some embodiments.

FIG. 6 is a flow diagram illustrating an example method for tracking a cache entry used for a search, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, control circuitry performs multiple searches of a data structure. Searches may proceed at least partially in parallel. One or more of the searches may traverse multiple links between elements of the data structure. Therefore, caching results from link traversal may allow other searches to skip these links and improve search performance. In some embodiments, the data structure is a linked list. In some embodiments, the data structure is a radix tree, a search tree, an expression tree, or some other type of linked data structure. Further, although linked data structures are discussed herein for purposes of illustration, disclosed techniques may be applied to various other types of searchable data structures.

The first search may be a page table walk of a hierarchical page table data structure for an address translation from a first address space (e.g., a virtual space) to a second address space (e.g., a physical space). The device may include one or more translation caches in addition to the traversal cache, e.g., as explained above with reference to FIG. 3. At least one of the translation caches (e.g., an S1TC) may store traversal information that allows skipping one or more levels of the hierarchical page table data structure. The traversal cache (e.g., HTLB) may store locations of entries in the hierarchical page table data structure that indicate addresses corresponding to a last node at a given level of the hierarchical page table data structure (e.g., the location of an hL3 entry that indicates the location of an L0, L1, L2, or L3 node in the embodiment of FIG. 3). The one or more translation caches (e.g., one or more S2TC caches) may store guest physical address to physical address translation information that allows skipping translations for one or more hypervisor translations within a level of the hierarchical page table data structure. The device may also include a translation lookaside buffer configured to store translations of addresses in the first address space to addresses in the second address space.

At 620, in the illustrated embodiment, a traversal cache caches traversal information that is usable by searches to skip one or more links traversed by one or more prior searches. For example, the HTLB may cache traversal information to translate a GPA to a physical address of an L0, L1, L2, or L3 node in the example of FIG. 3.

At 630, in the illustrated embodiment, tracking control circuitry stores tracking information in a first entry, where the tracking information indicates a location in the traversal cache at which prior traversal information for a first search is stored. The tracking control circuitry may store tracking information that indicates locations in the traversal cache at which prior traversal information is stored for multiple searches, e.g., tracking one or more traversal cache entries for each active table walk in tracking queue 500.

At 640, in the illustrated embodiment, replacement control circuitry selects, based on the tracking information in the first entry of the tracking control circuitry, an entry in the traversal cache for new traversal information generated by the first search. For example, the replacement control circuitry may select the location in the traversal cache to replace the prior traversal information with the new traversal information. This may override a default replacement policy to select the location for the new traversal information. As another example, the replacement control circuitry may allocate a new entry in the traversal cache for the new traversal information but adjust a retention value for the first entry.

Example Device

Figure 7:
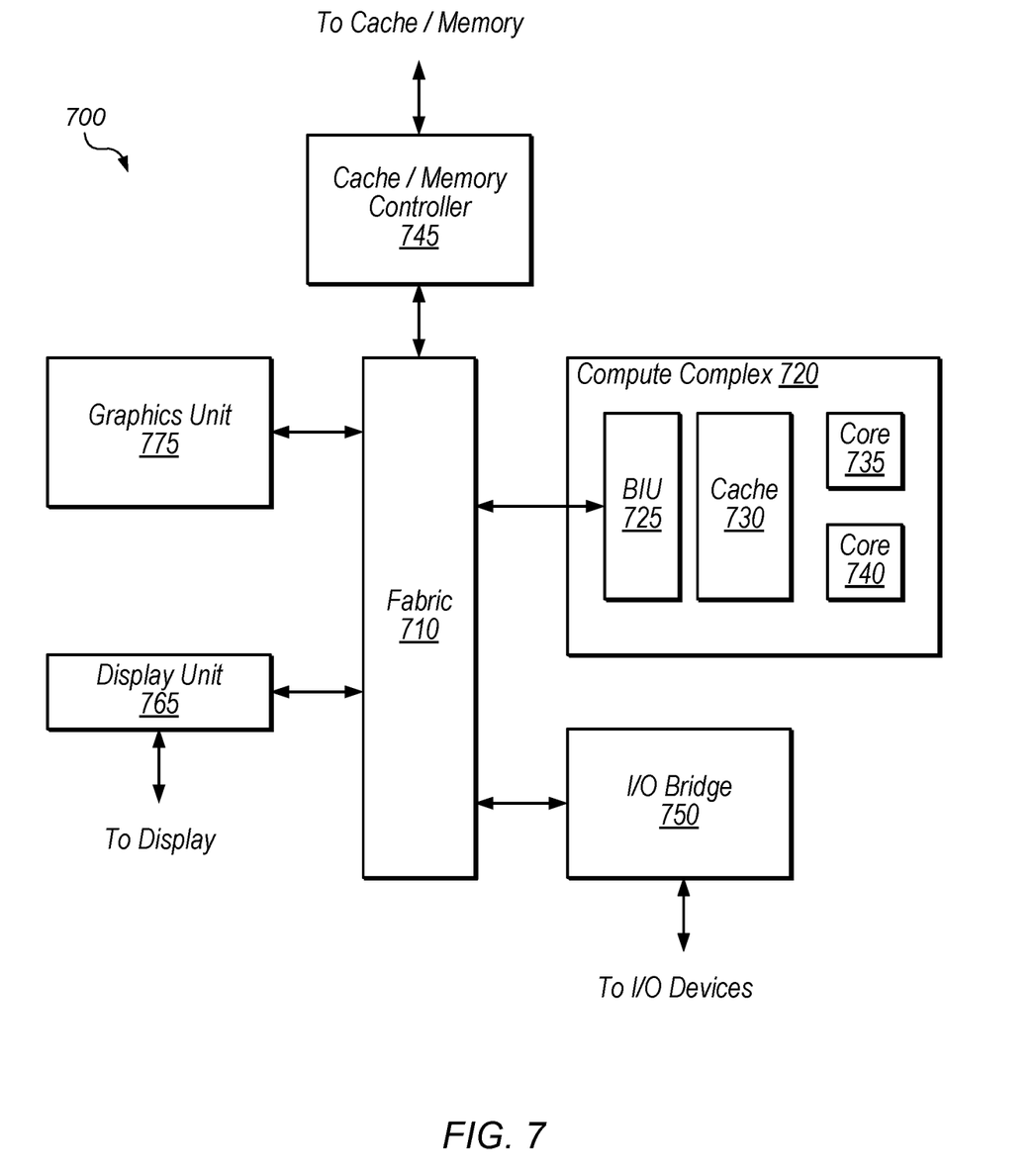
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, one or more of cache/memory controller 745, compute complex 720, and graphics unit 775 include disclosed traversal circuitry, which may improve their performance, e.g., for address translations or other search operations, relative to traditional implementation.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Example Applications

Figure 8:
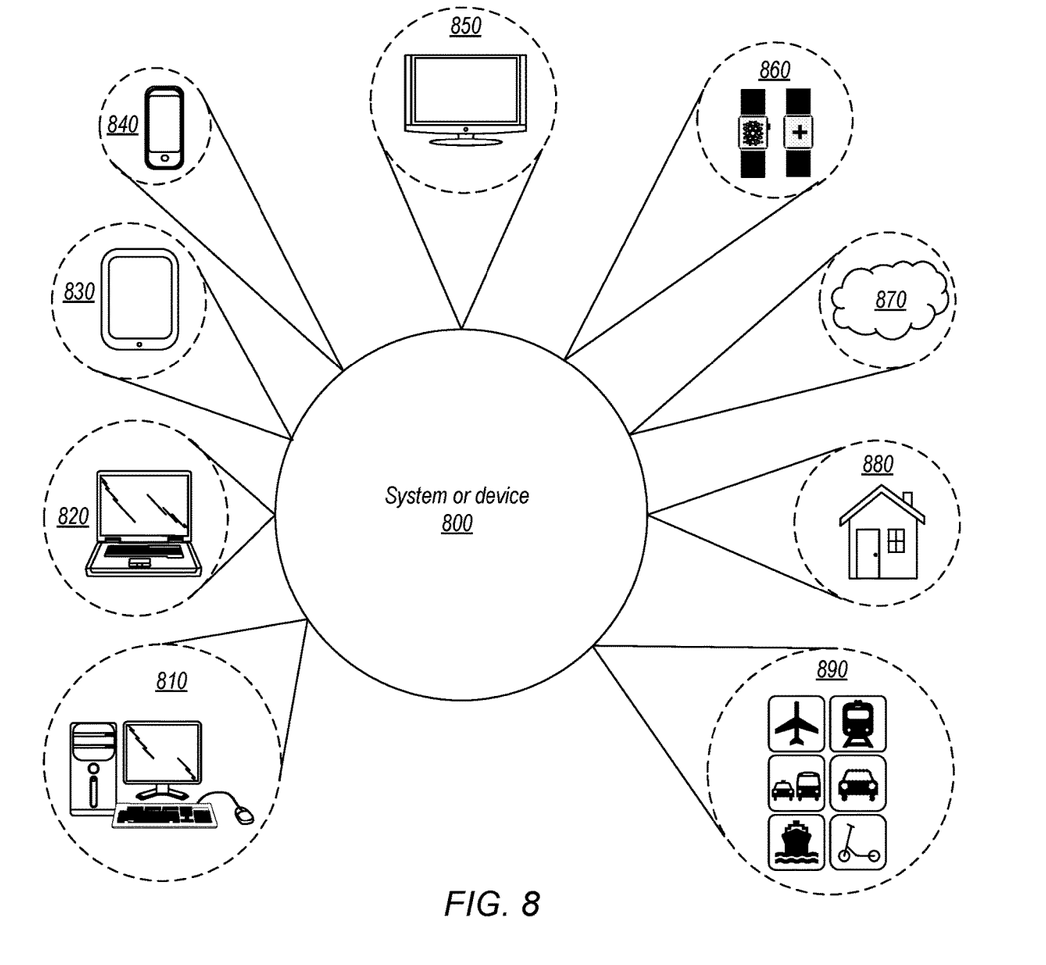
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
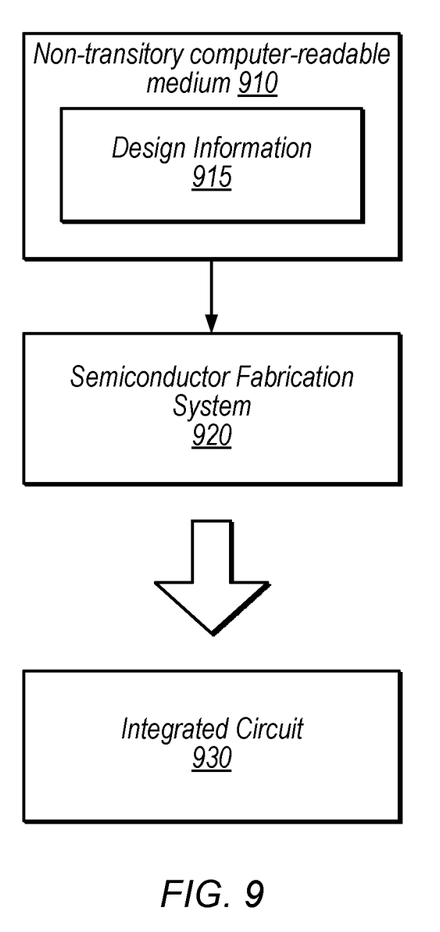
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1, 4-5, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation

[entity] configured to [perform one or more tasks] is used herein to refer to structure Le something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   search control circuitry configured to perform multiple searches of a data structure, wherein one or more of the searches traverse multiple links between elements of the data structure;
   a traversal cache configured to cache traversal information that is usable by searches to skip one or more links traversed by one or more prior searches;
   tracking control circuitry configured to store tracking information in a first entry, wherein the tracking information indicates a location in the traversal cache at which prior traversal information for a first search is stored; and
   replacement control circuitry configured to select, based on the tracking information in the first entry of the tracking control circuitry, an entry in the traversal cache for new traversal information generated by the first search.

2. The apparatus of claim 1, wherein the replacement control circuitry is configured to select the location in the traversal cache to replace the prior traversal information with the new traversal information.

3. The apparatus of claim 2, wherein the replacement control circuitry is configured to override a default replacement policy to select the location in the traversal cache.

4. The apparatus of claim 1,
   wherein the first search is a page table walk of a hierarchical page table data structure for an address translation from a first address space to a second address space; and
   wherein the apparatus further comprises one or more translation caches in addition to the traversal cache.

5. The apparatus of claim 4, wherein at least one of the one or more translation caches stores traversal information that allows skipping one or more levels of the hierarchical page table data structure; and
   wherein the traversal cache stores locations of entries in the hierarchical page table data structure that indicate addresses of a last node at a given level of the hierarchical page table data structure.

6. The apparatus of claim 4, wherein the one or more translation caches store guest physical address to physical address translation information that allows skipping translations for one or more hypervisor translations within a level of the hierarchical page table data structure.

7. The apparatus of claim 4, further comprising:
   a translation lookaside buffer configured to store translations of addresses in the first address space to addresses in the second address space.

8. The apparatus of claim 1, wherein the tracking control circuitry is configured to store tracking information that indicates locations in the traversal cache at which prior traversal information is stored for multiple searches and wherein at least a portion of first and second searches of the multiple searches are performed in parallel.

9. The apparatus of claim 1, wherein the data structure is a linked list.

10. A method, comprising:
    performing, by control circuitry, multiple searches of a data structure, wherein one or more of the searches traverse multiple links between elements of the data structure;
    caching, by a traversal cache, traversal information that is usable by searches to skip one or more links traversed by one or more prior searches;
    storing, by tracking control circuitry, tracking information in a first entry, wherein the tracking information indicates a location in the traversal cache at which prior traversal information for a first search is stored; and
    selecting, by replacement control circuitry based on the tracking information in the first entry of the tracking control circuitry, an entry in the traversal cache for new traversal information generated by the first search.

11. The method of claim 10, wherein the selecting includes selecting the location in the traversal cache to replace the prior traversal information with the new traversal information and wherein the selecting overrides a default replacement policy.

12. The method of claim 10, wherein the first search is a page table walk of a hierarchical page table data structure for an address translation from a first address space to a second address space, the method further comprising storing traversal information in one or more other translation caches in addition to the traversal cache.

13. The method of claim 10, wherein the data structure is a linked list.

14. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
    search control circuitry configured to perform multiple searches of a data structure, wherein one or more of the searches traverse multiple links between elements of the data structure;
    a traversal cache configured to cache traversal information that is usable by searches to skip one or more links traversed by one or more prior searches;
    tracking control circuitry configured to store tracking information in a first entry, wherein the tracking information indicates a location in the traversal cache at which prior traversal information for a first search is stored; and
    replacement control circuitry configured to select, based on the tracking information in the first entry of the tracking control circuitry, an entry in the traversal cache for new traversal information generated by the first search.

15. The non-transitory computer readable storage medium of claim 14, wherein the replacement control circuitry is configured to select the location in the traversal cache to replace the prior traversal information with the new traversal information.

16. The non-transitory computer readable storage medium of claim 15, wherein the replacement control circuitry is configured to override a default replacement policy to select the location in the traversal cache based on validity of the first entry of the tracking control circuitry.

17. The non-transitory computer readable storage medium of claim 14, wherein the first search is a page table walk of a hierarchical page table data structure for an address translation from a first address space to a second address space; and
    wherein the circuit further comprises one or more translation caches in addition to the traversal cache.

18. The non-transitory computer readable storage medium of claim 17, wherein at least one of the one or more translation caches stores traversal information that allows skipping one or more levels of the hierarchical page table data structure; and wherein the traversal cache stores locations of entries in the hierarchical page table data structure that indicate addresses of a last node at a given level of the hierarchical page table data structure.

19. The non-transitory computer readable storage medium of claim 17, wherein the circuit further comprises:
a translation lookaside buffer configured to store translations of addresses in the first address space to addresses in the second address space.

20. The non-transitory computer readable storage medium of claim 14, wherein the data structure is a linked list.

\* \* \* \* \*